(12) United States Patent
Carbone

(10) Patent No.: US 8,096,652 B1
(45) Date of Patent: Jan. 17, 2012

(54) HEADBAND EYEGLASSES

(76) Inventor: Valerie Carbone, Coral Springs, FL (US)

( * ) Notice: Subject to any disclaimer, the term of this patent is extended or adjusted under 35 U.S.C. 154(b) by 145 days.

(21) Appl. No.: 12/727,797

(22) Filed: Mar. 19, 2010

Related U.S. Application Data

(63) Continuation-in-part of application No. 12/206,286, filed on Sep. 8, 2008, now abandoned.

(51) Int. Cl.
*G02C 7/06* (2006.01)

(52) U.S. Cl. ........... 351/54; 351/124; 351/131; 351/156

(58) Field of Classification Search .............. 351/41, 351/44, 54, 111, 113–115, 156, 158
See application file for complete search history.

(56) References Cited

U.S. PATENT DOCUMENTS

| D154,102 S | 7/1947 | Davis |
| D200,735 S | 3/1965 | Mitchell |
| 3,774,998 A | 11/1973 | Kise |
| D388,114 S * | 12/1997 | Ferro ............... D16/309 |
| 7,347,544 B1 | 3/2008 | McLaughlin |
| 2008/0283082 A1* | 11/2008 | Jagemann ............ 132/275 |
| 2009/0021689 A1* | 1/2009 | Assia .................. 351/87 |

* cited by examiner

*Primary Examiner* — Huy K Mai
(74) *Attorney, Agent, or Firm* — Gold & Rizvi, P.A.; H. John Rizvi; Glenn E. Gold

(57) ABSTRACT

Mask headband eyeglasses include a mask body and a pair of eyeglass lenses contained in the mask body. The mask body has a substantial headband shape. The mask body includes a front portion and a pair of support arms. Strip headband eyeglasses include a strip of material and a pair of eyeglass lenses. A top of the pair of eyeglass lenses are secured to the strip of material. Fabric covered headband eyeglasses include a fabric body and a pair of eyeglass lenses retained in the fabric body. Styled rod headband eyeglasses include a rod body and a pair of eyeglass lenses retained in the rod body. The rod body includes a bridge rod, a first lens retainer, a first support arm, a second lens retainer and a second support arm. The headband eyeglasses are worn as either a headband or as eyeglasses/sunglasses. Reversible headband eyeglasses may be worn upside down.

19 Claims, 5 Drawing Sheets

HEADBAND EYEGLASSES

CROSS-REFERENCE TO RELATED APPLICATIONS

This is a Continuation-In-Part Patent Application claiming the benefit of United States Non-Provisional application Ser. No. 12/206,286, filed on Sep. 8, 2008, which claims the benefit of U.S. Provisional Patent Application Ser. No. 61/015,475, filed on Dec. 20, 2007, which is incorporated herein in its entirety.

BACKGROUND OF THE INVENTION

1. Field of the Invention

The present invention relates generally to headbands and more particularly, to headband eyeglasses, which incorporate a pair of eyeglass or sunglass lenses into a headband.

2. Description of the Prior Art

It appears that headbands with integrated eyeglass lenses are not disclosed by any prior art device.

Accordingly, there is an established need for headband eyeglasses, which incorporate a pair of eyeglass or sunglass lenses into a headband that allow the headband eyeglasses to be used as a headband or as eyeglasses.

SUMMARY OF THE INVENTION

The invention is directed to headband eyeglasses, which have a pair of lenses from eyeglasses or sunglasses incorporated into the headband for convenient storage on a person's head.

In one general aspect of the present invention, mask headband eyeglasses include a mask body and a pair of eyeglass lenses, which are retained in the mask body.

In another aspect of the present invention, mask headband eyeglasses include a substantial headband shape and a nose notch for receiving a human nose.

In a further aspect of the present invention, strip headband eyeglasses include a strip of material having a substantial headband shape and a pair of eyeglass lenses that are attached to the strip of material.

In yet a further object of the present invention, strip headband eyeglass with folding support arms include two support arms and a lens holding frame for retaining a pair of eyeglass lenses.

In yet a further object of the present invention, fabric covered headband eyeglasses include a fabric body and a pair of eyeglass lenses retained in the fabric body.

In yet a further object of the present invention, fabric covered headband eyeglasses include a nose bridge, a first lens retainer, a second lens retainer, a first support arm and a second support arm.

In yet a further object of the present invention, styled rod headband eyeglasses include a rod body and a pair of eyeglass lenses retained in the rod body.

In yet a further object of the present invention, styled rod headband eyeglasses include a bridge rod, a first lens retainer, a first support arm, a second lens retainer and a second support arm.

In yet a further object of the present invention, headband eyeglasses may be worn as a headband or used as a pair of eyeglasses or sunglasses.

In yet a further object of the present invention, headband eyeglasses include a double nose bridge with two opposing concave surfaces that are sized to receive a human nose, such that a wearer does not have to worry about the orientation of the headband eyeglasses.

These and other aspects, features, and advantages of the present invention will become more readily apparent from the attached drawing and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION OF THE PREFERRED EMBODIMENTS

Figure 1:
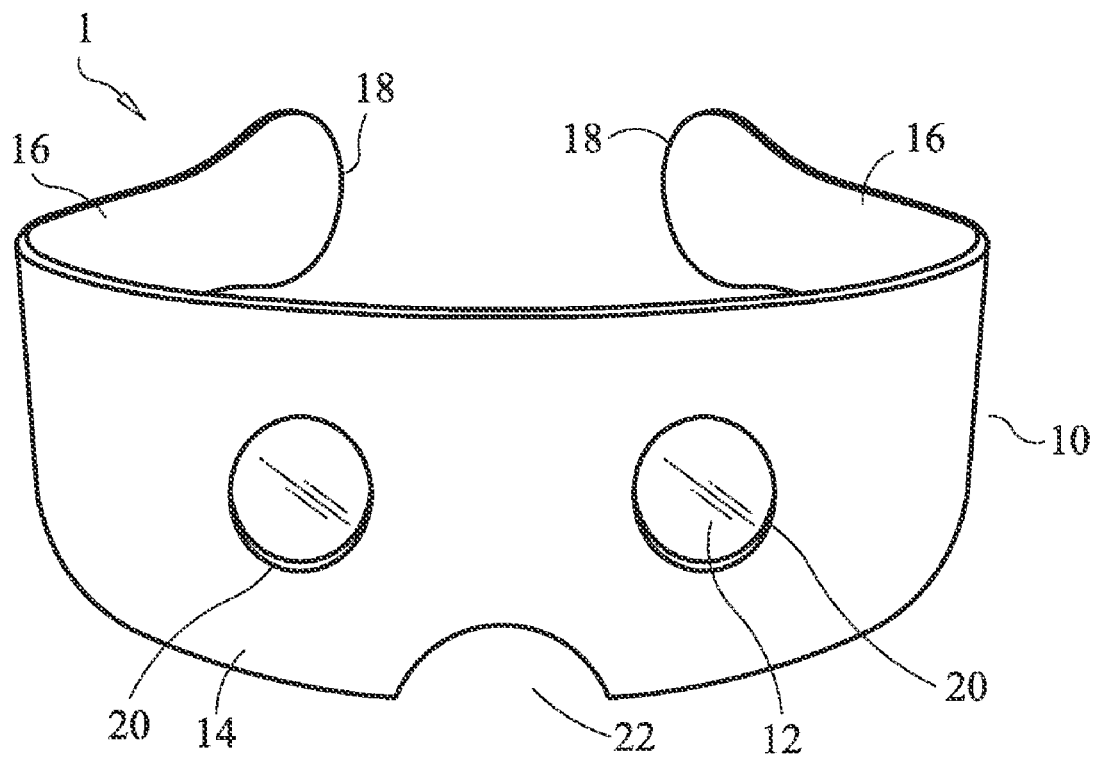
FIG. 1 is a perspective view of mask headband eyeglasses.

Shown throughout the figures, the present invention is generally directed to headband eyeglasses. Referring briefly to FIG. 1, mask headband eyeglasses 1 include a mask body 10 and a pair of eyeglass lenses 12. The mask body 10 has a substantial headband shape. The mask body 10 includes a front portion 14 and a pair of support arms 16. The mask body 10 is fabricated from a material having memory. A material having memory means that when the material (mask body 10) is deformed by spreading for placement on a human head that the material (mask body 10) afterwards returns to its original shape.

A single support arm 16 extends from each end of the front portion 14. The pair support arms 16 are structured to rest on a pair of human ears. A contact pad 18 preferably terminates an end of each support arm 16. The contact pad 18 increases the contact area between an end of the mask body 10 and a side of a human head. A pair of lens openings 20 are formed through the front portion 14, such that they align with human eyes. A perimeter of a single lens 12 is secured to the area adjacent the perimeter of a single lens opening 20 with any suitable method, such as adhesive. A nose notch 22 is formed in a bottom of the front portion 14 to receive a human nose. The mask headband eyeglasses 1 are worn as either a headband in FIG. 5 or as eyeglasses or sunglasses in FIG. 6.

Figure 2:
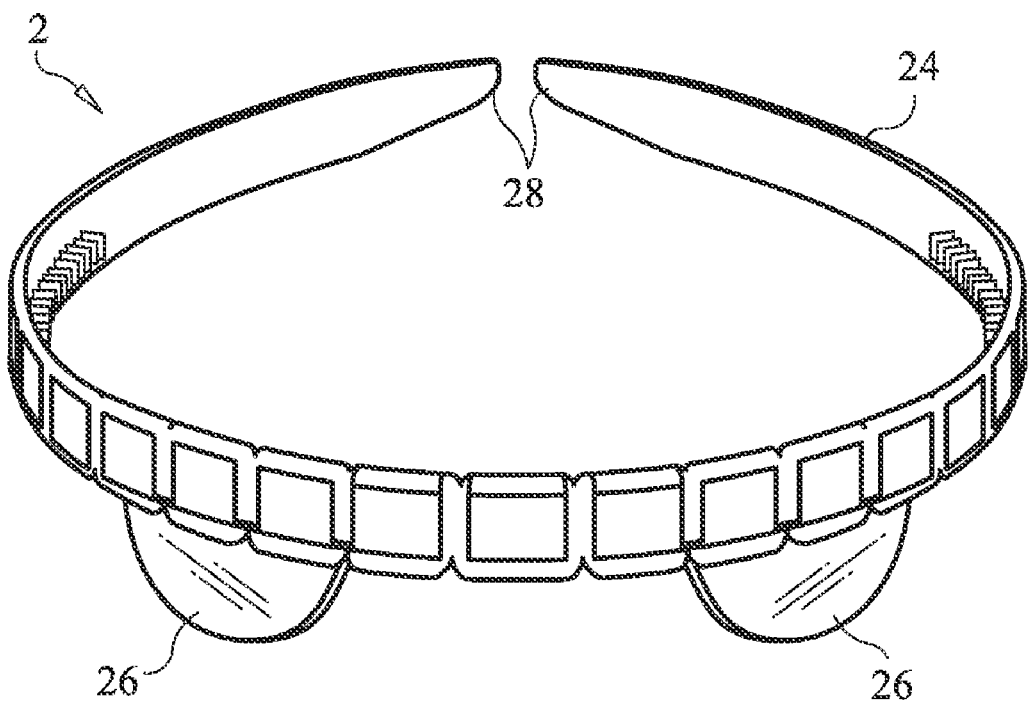
FIG. 2 is a perspective view of strip headband eyeglasses.
Figure 6:
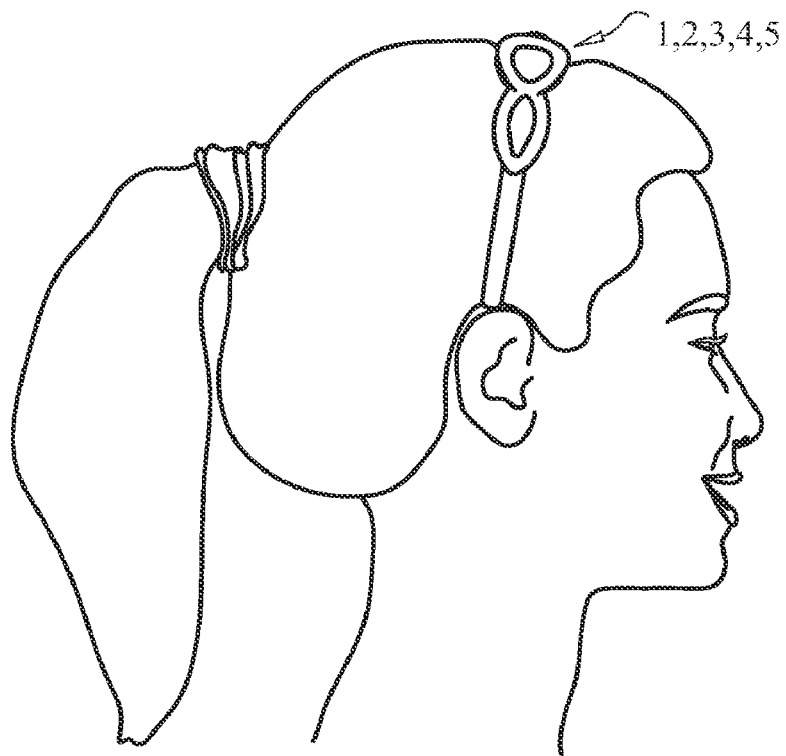
FIG. 6 is a perspective view of a woman wearing headband eyeglasses as a headband.
Figure 7:
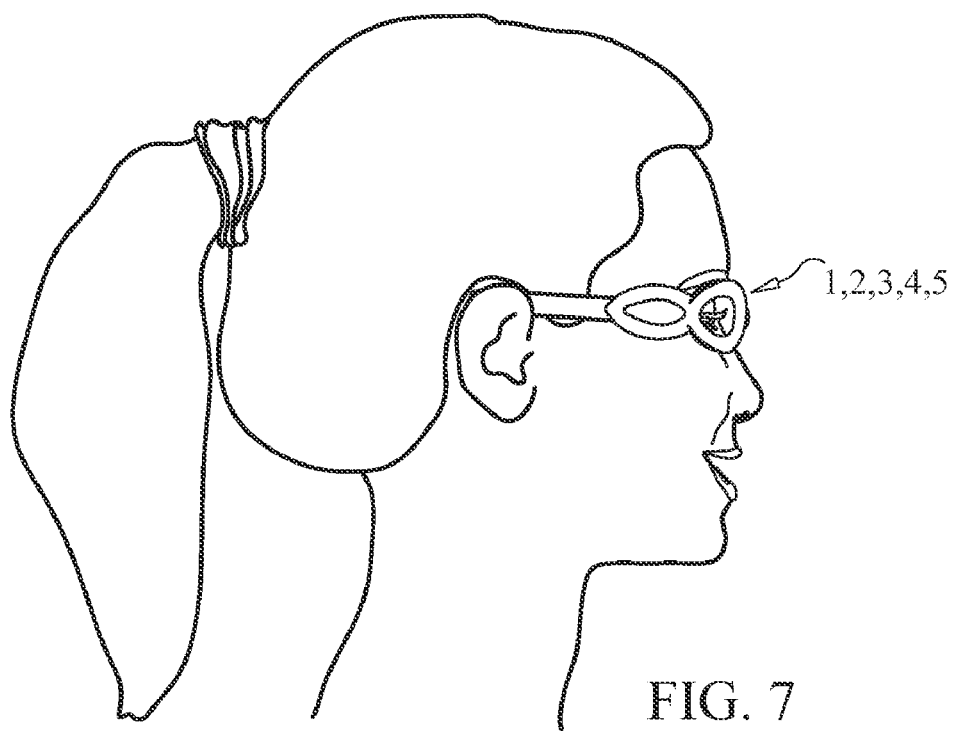
FIG. 7 is a perspective view of a woman wearing headband eyeglasses as eyeglasses or sunglasses.

Referring briefly to FIG. 2, strip headband eyeglasses 2 include a strip of material 24 and a pair of eyeglass lenses 26. The strip of material 24 has a substantial headband shape. Each end of the strip of material 24 preferably includes a tapered end 28. The strip of material 24 is fabricated from a material having memory. A top of the pair of eyeglass lenses 26 are secured to the strip of material 24 with any suitable method, such as adhesive. The pair of eyeglass lenses 26 are attached to the strip of material 24, such that they align with human eyes. The strip headband eyeglasses 2 are worn as either a headband in FIG. 6 or as eyeglasses or sunglasses in FIG. 7.

Figure 2A:
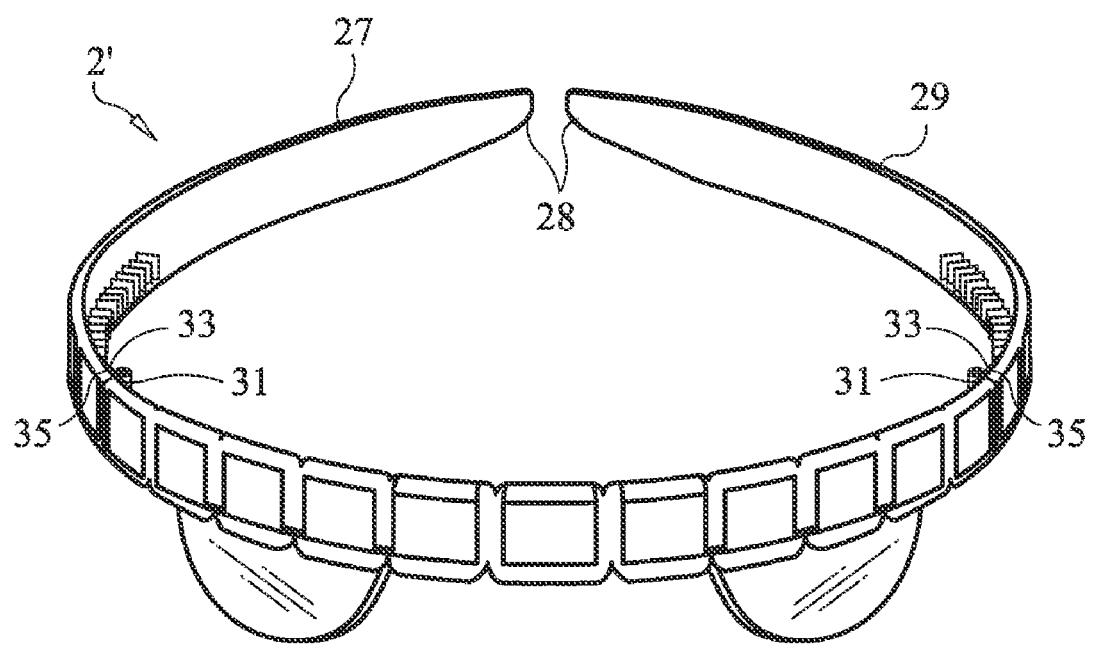
FIG. 2a is a perspective view of strip headband eyeglasses with a pair of folding support arms.

Referring briefly to FIG. 2a, strip headband eyeglasses with folding support arms 2' includes a lens holding frame 25, a first folding support arm 27, a second folding support arm 29 and the pair of eyeglass lenses 26. The lens holding frame 25 has an outward curving shape, similar to a front portion of a headband. A top of the pair of eyeglass lenses 26 are secured to the lens holding frame 25 with any suitable method, such as adhesive. The pair of eyeglass lenses 26 are attached to the lens holding frame 25, such that they align with human eyes. A frame hinge portion 31 is formed on each end of the lens holding frame 25 with any suitable method.

The first folding support arm 27 has an outward curving shape, similar to a side portion of a headband. An arm hinge portion 33 is formed on one end of the first folding support arm 29 with any suitable method. The tapered end 28 is formed on the other end of the first folding arm support 27. The second folding support arm 29 has an outward curving shape, similar to a side portion of a headband. An arm hinge portion 33 is formed on one end of the second folding support arm 29 with any suitable method. The tapered end 28 is formed on the other end of the second folding arm support 29.

The first folding arm support 27 is pivotally retained on the one end of the lens holding frame 25 by connecting the strip hinge portion 31 with the arm hinge portion 33 by insertion of a pivot pin 35 or the like. The second folding arm support 27 is pivotally retained on the one end of the lens holding frame 25 by connecting the strip hinge portion 31 with the arm hinge portion 33 by insertion of a pivot pin 35 or the like. The assembly of the lens holding frame 25, the first folding arm support 27 and the second folding arm support 29 forms a headband shape. The strip headband eyeglasses with folding support arms 2' are worn as either a headband in FIG. 6 or as eyeglasses or sunglasses in FIG. 7.

Figure 3:
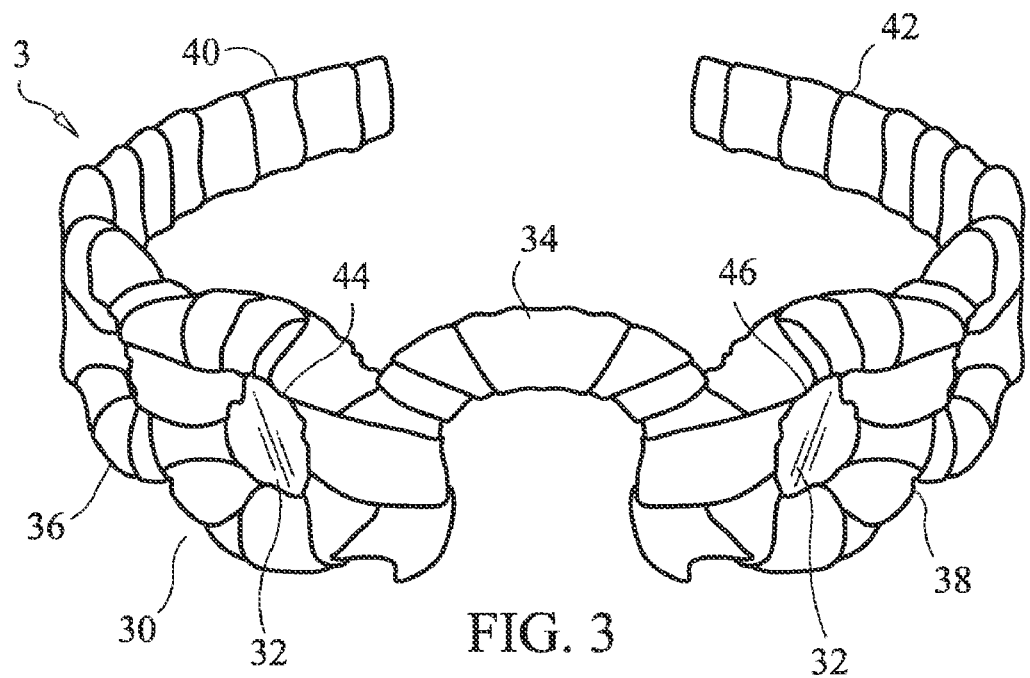
FIG. 3 is a perspective view of fabric covered headband eyeglasses.

Referring briefly to FIG. 3, fabric covered headband eyeglasses 3 include a fabric body 30 and a pair of eyeglass lenses 32. The fabric body 30 has a substantial headband shape. The fabric body 30 includes a nose bridge 34, a first lens retainer 36, a second lens retainer 38, a first support arm 40 and a second support arm 42. The nose bridge 34 receives a human nose. The first and second support arms are structured to rest on a pair of human ears. One end of the first lens retainer 36 extends from one end of the nose bridge 34 and the second lens retainer 38 extends from the other end of the nose bridge 34. The first support arm extends from the other end of the first lens retainer 36 and the second support arm extends from the other end of the second lens retainer 38.

A first lens opening 44 is formed through the first lens retainer 36 and a second lens opening 46 is formed through the second lens retainer 38, such that they align with human eyes. The fabric body 30 is fabricated from a material having memory. A perimeter of a single lens 32 is secured to the area adjacent the perimeter of a single lens opening 44, 46 with any suitable method, such as adhesive. The mask headband eyeglasses 3 are worn as either a headband in FIG. 6 or as eyeglasses or sunglasses in FIG. 7.

Figure 4:
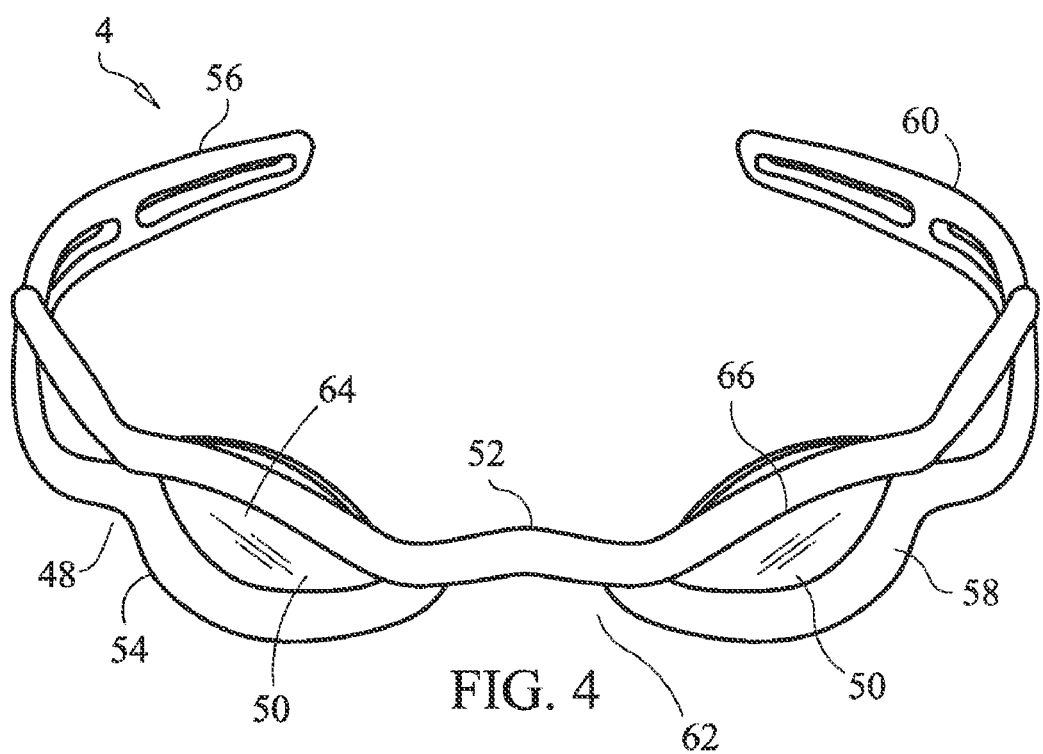
FIG. 4 is a perspective view of styled rod headband eyeglasses.

Referring briefly to FIG. 4, styled rod headband eyeglasses 4 include a rod body 48 and a pair of eyeglass lenses 50. The rod body 48 has a substantial headband shape. The rod body 48 is fabricated from a material having memory. The rod body 48 includes a bridge rod 52, a first lens retainer 54, a first support arm 56, a second lens retainer 58 and a second support arm 60. One end of the bridge rod 52 is attached to a top of the first lens retainer 54 and the other end of the bridge rod is attached to a top of the second lens retainer 58, such that a nose clearance 62 is formed. The first and second support arms are structured to rest on a pair of human ears. The bridge rod 52 and the first lens retainer 54 forms a first lens opening 64 and the bridge rod 52 and the second lens retainer 58 forms a second lens opening 66. The first support arm 56 extends from the first lens retainer 54 and the second support arm 60 extends from the second lens retainer 58. A perimeter of a single lens 50 is secured to the area adjacent the perimeter of the first and second lens openings with any suitable method, such as adhesive. The styled rod headband eyeglasses 4 are worn as either a headband in FIG. 6 or as eyeglasses or sunglasses in FIG. 7.

Figure 5:
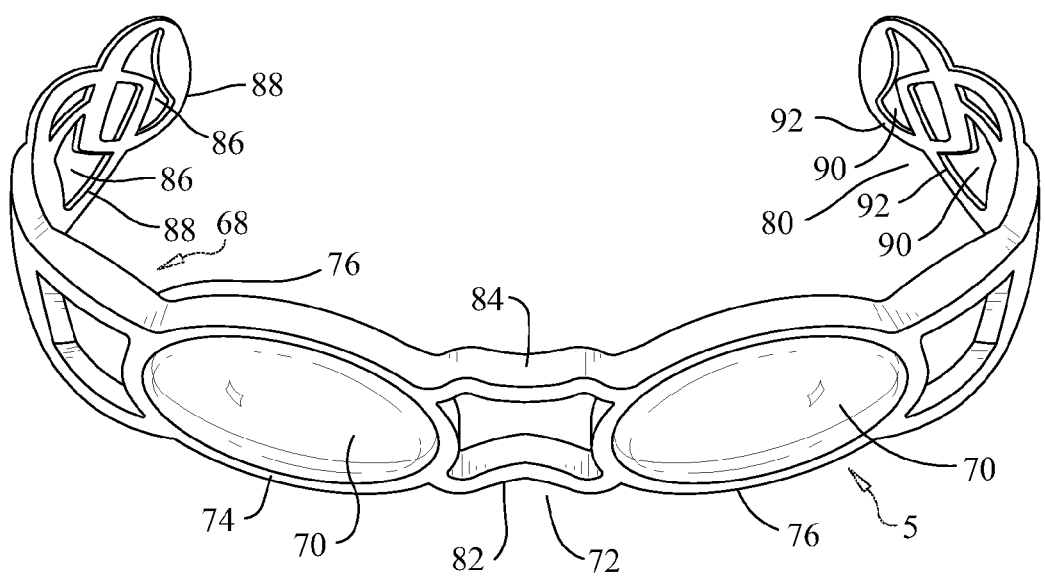
FIG. 5 is a perspective view of reversible headband eyeglasses.

Referring briefly to FIG. 5, reversible headband eyeglasses 5 include a reversible body 68 and a pair of eyeglass lenses 70. The pair of eyeglass lenses 70 improve a wearer's eyesight or provide protection to the wearer's eyes from sun, impact or any other threat. The reversible body 68 is fabricated from a material having memory. The reversible body 68 also has a substantial headband shape, which is sized to fit around a top of a human head in a substantially vertical orientation. The reversible body 68 includes, a double nose bridge 72, a first lens retainer 74, a first support arm 76, a second lens retainer 78 and a second support arm 80. The first and second support arms are structured to rest on a pair of human ears. The double nose bridge 72 includes a bottom concave surface 82 and an opposing top concave surface 84 that are sized to receive a bridge of a human nose.

One end of the first lens retainer 74 extends from one side of the nose bridge 72 and one end of the second lens retainer 76 extends from the other side of the nose bridge 72. The pair of eyeglass lens 70 are retained in the first and second lens retainers. The first support arm 76 extends from the other end of the first lens retainer 74 and the second support arm 80 extends from the other end of the second lens retainer 76. A plurality of first openings 86 are preferably formed through the first support arm 76. The plurality of first openings 86 are created by a plurality of strands 88 in the first support arm 76. A plurality of second openings 90 are formed through the second support arm 80. The plurality of second openings 90 are created by a plurality of second strands 92 that are contained in the second support arm 80. The reversible headband eyeglasses 5 are worn as either a headband in FIG. 6 or as eyeglasses or sunglasses in FIG. 7.

The strip headband eyeglasses 2' includes a pair of folding support arms. The concept of headband sunglasses with folding support arms should not be limited to the strip headband eyeglasses 2, but should include the mask headband eyeglasses 1, the fabric covered headband eyeglasses 3 and the styled rod headband eyeglasses 4 and the reversible headband eyeglasses 5.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:
1. Reversible headband eyeglasses comprising:
   a reversible body includes a double nose bridge, a first lens retainer, a first support arm, a second lens retainer and a second support arm, said reversible body having a substantial headband shape, said double nose bridge includes a bottom concave surface and a top concave surface, one end of said first lens retainer extends from one side of said double nose bridge, one end of said second lens retainer extends from the other side of said double nose bridge, said first support arm extends from the other end of said first lens retainer, said second support arm extends from the other end of said second lens retainer;

a first eyeglass lens is retained in said first lens retainer; and a second eyeglass lens is retained in said second lens retainer.

2. The reversible headband eyeglasses of claim 1, wherein:
said first and second concave surfaces are sized to receive a bridge of a human nose.

3. The reversible headband eyeglasses of claim 1, wherein:
said first and second eyeglass lenses are spaced apart for a pair of human eyes.

4. The headband eyeglasses of claim 1, wherein:
a plurality of first openings are formed through said first support arm, a plurality of second openings are formed through said second support arm.

5. The headband eyeglasses of claim 4, wherein:
said plurality of first openings are created by a plurality of first strands that are contained in said first support arm, said plurality of second openings are created by a plurality of second strands that are contained in said second support arm.

6. The headband eyeglasses of claim 1, further comprising:
said substantial headband shape is sized to fit around a top of a human head in a substantially vertically orientation.

7. The headband eyeglasses of claim 1, further comprising:
said reversible body is fabricated from a material having memory.

8. Reversible headband eyeglasses comprising:
a reversible body includes a double nose bridge, a first lens retainer, a first support arm, a second lens retainer and a second support arm, said reversible body having a substantial headband shape, said double nose bridge includes a bottom concave surface and a top concave surface, one end of said first lens retainer extends from one side of said double nose bridge, one end of said second lens retainer extends from the other side of said double nose bridge, said first support arm extends from the other end of said first lens retainer, said second support arm extends from the other end of said second lens retainer, said reversible body is fabricated from a material having memory;

a first eyeglass lens is retained in said first lens retainer; and a second eyeglass lens is retained in said second lens retainer.

9. The reversible headband eyeglasses of claim 8, wherein:
said first and second concave surfaces are sized to receive a bridge of a human nose.

10. The reversible headband eyeglasses of claim 8, wherein:
said first and second eyeglass lenses are spaced apart for a pair of human eyes.

11. The headband eyeglasses of claim 8, wherein:
a plurality of first openings are formed through said first support arm, a plurality of second openings are formed through said second support arm.

12. The headband eyeglasses of claim 11, wherein:
said plurality of first openings are created by a plurality of first strands that are contained in said first support arm, said plurality of second openings are created by a plurality of second strands that are contained in said second support arm.

13. The headband eyeglasses of claim 8, further comprising:
said substantial headband shape is sized to fit around a top of a human head in a substantially vertically orientation.

14. Reversible headband eyeglasses comprising:
a reversible body includes a double nose bridge, a first lens retainer, a first support arm, a second lens retainer and a second support arm, said reversible body having a substantial headband shape, said double nose bridge includes a bottom concave surface and a top concave surface, said first and second concave surfaces are sized to receive a bridge of a human nose, one end of said first lens retainer extends from one side of said double nose bridge, one end of said second lens retainer extends from the other side of said double nose bridge, said first support arm extends from the other end of said first lens retainer, said second support arm extends from the other end of said second lens retainer;

a first eyeglass lens is retained in said first lens retainer; and a second eyeglass lens is retained in said second lens retainer.

15. The reversible headband eyeglasses of claim 14, wherein:
said first and second eyeglass lenses are spaced apart for a pair of human eyes.

16. The headband eyeglasses of claim 14, wherein:
said reversible body is fabricated from a material having memory.

17. The headband eyeglasses of claim 14, wherein:
a plurality of first openings are formed through said-first support arm, a plurality of second openings are formed through said second support arm.

18. The headband eyeglasses of claim 17, wherein:
said plurality of first openings are created by a plurality of first strands that are contained in said first support arm, said plurality of second openings are created by a plurality of second strands that are contained in said second support arm.

19. The headband eyeglasses of claim 14, further comprising:
said substantial headband shape is sized to fit around a top of a human head in a substantially vertically orientation.

* * * * *